United States Patent
Fabris et al.

(10) Patent No.: US 8,545,233 B2
(45) Date of Patent: Oct. 1, 2013

(54) LAPTOP-BASED MACHINE CONTROL SIMULATOR

(75) Inventors: James D. Fabris, Carmel, IN (US); Gregory S. Volovic, Carmel, IN (US); Frederick W. Gross, Carmel, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 782 days.

(21) Appl. No.: 11/703,379

(22) Filed: Feb. 7, 2007

(65) Prior Publication Data

US 2007/0184428 A1 Aug. 9, 2007

Related U.S. Application Data

(60) Provisional application No. 60/771,249, filed on Feb. 8, 2006.

(51) Int. Cl.
*G09B 25/00* (2006.01)
(52) U.S. Cl.
USPC .......................................... 434/379; 434/118
(58) Field of Classification Search
USPC ... 434/365, 379, 118; 703/6, 13; 235/145 A, 235/145 R, 146
See application file for complete search history.

(56) References Cited

U.S. PATENT DOCUMENTS

| | | |
|---|---|---|
| 4,041,283 A | 8/1977 | Mosier |
| 4,075,465 A | 2/1978 | Funk et al. |
| 4,092,527 A | 5/1978 | Luecke |
| 4,158,130 A | 6/1979 | Speraw et al. |
| 4,456,315 A | 6/1984 | Markley et al. |
| 4,564,751 A | 1/1986 | Alley et al. |
| 4,595,804 A | 6/1986 | MacConnell |
| D288,820 S | 3/1987 | Couch et al. |
| 4,688,020 A | 8/1987 | Kuehneman et al. |
| 4,704,940 A | 11/1987 | Cummings |
| 4,786,768 A | 11/1988 | Langewis et al. |
| 4,853,883 A | 8/1989 | Nickles et al. |
| 4,899,137 A | 2/1990 | Behrens et al. |
| 4,964,075 A | 10/1990 | Shaver et al. |

(Continued)

FOREIGN PATENT DOCUMENTS

| | | |
|---|---|---|
| EP | 0 093 509 | 11/1983 |
| GB | 2295480 | 5/1996 |

OTHER PUBLICATIONS

Hurco Companies Inc., Hurco Incontrol brochure, 16 pgs. 2004.

(Continued)

*Primary Examiner* — Bruk Gebremichael
(74) *Attorney, Agent, or Firm* — Faegre Baker Daniels LLP (57) ABSTRACT

A machine tool control simulator for a machine tool control having a plurality of first user-actuatable devices and a first display screen is disclosed. The machine tool control simulator may include a console and a laptop computer. The console may include a plurality of second user-actuatable devices each corresponding to a respective one of the first user-actuatable devices, and having a layout substantially similar to a layout of the first user-actuatable devices. The laptop computer includes a keyboard and an attached second display screen. The keyboard may be placed between a tabletop and the second user-actuatable devices. The computer receives user inputs from the second user actuatable devices and displays images on the second display screen to simulate images that would be displayed on the first display screen of the machine tool control in response to the user inputs.

18 Claims, 10 Drawing Sheets

(56) References Cited

U.S. PATENT DOCUMENTS

| | | | |
|---|---|---|---|
| 5,132,876 A | 7/1992 | Ma | |
| 5,175,398 A | 12/1992 | Hofman | |
| 5,187,644 A | 2/1993 | Crisan | |
| 5,193,924 A | 3/1993 | Larson | |
| 5,214,429 A | 5/1993 | Greenberger | |
| 5,229,920 A | 7/1993 | Spanoil et al. | |
| 5,250,929 A * | 10/1993 | Hoffman et al. | 715/823 |
| 5,278,779 A | 1/1994 | Conway et al. | |
| 5,319,582 A | 6/1994 | Ma | |
| 5,336,001 A | 8/1994 | Lichtenberg | |
| 5,481,645 A | 1/1996 | Bertino et al. | |
| 5,514,855 A * | 5/1996 | Sullivan | 235/145 R |
| 5,531,529 A | 7/1996 | Nusser | |
| 5,590,022 A | 12/1996 | Harvey | |
| 5,667,319 A | 9/1997 | Satloff | |
| 5,894,406 A | 4/1999 | Blend et al. | |
| 5,926,364 A * | 7/1999 | Karidis | 361/679.27 |
| 5,977,872 A * | 11/1999 | Guertin | 340/515 |
| 5,992,817 A | 11/1999 | Klitsner et al. | |
| 6,322,449 B1 | 11/2001 | Klitsner et al. | |
| 6,472,626 B2 | 10/2002 | Hayes | |
| 6,650,254 B1 | 11/2003 | Rix | |
| 6,703,962 B1 | 3/2004 | Marics et al. | |
| 2002/0056612 A1 | 5/2002 | Hayes | |
| 2002/0163509 A1 * | 11/2002 | Roberts | 345/173 |
| 2003/0236654 A1 | 12/2003 | Flynn et al. | |
| 2004/0030538 A1 | 2/2004 | Hawthorne et al. | |
| 2005/0071802 A1 * | 3/2005 | Brakelmann et al. | 717/100 |
| 2005/0084831 A1 * | 4/2005 | Ison et al. | 434/219 |
| 2005/0278154 A1 | 12/2005 | Abebe et al. | |
| 2006/0022956 A1 | 2/2006 | Lengeling et al. | |
| 2006/0119586 A1 * | 6/2006 | Grant et al. | 345/173 |
| 2007/0020605 A1 * | 1/2007 | Berger et al. | 434/365 |

OTHER PUBLICATIONS

English translation of Office Action from Taiwan Intellectual Property Office for Application 096104403 (4 pgs.); Issuance date: May 2010.

Search Report in corresponding application EP07250366.7; Date, Jun. 2007.

* cited by examiner

LAPTOP-BASED MACHINE CONTROL SIMULATOR

CROSS-REFERENCE TO RELATED APPLICATION

This application claims the benefit of U.S. Provisional Application Ser. No. 60/771,249, filed Feb. 8, 2006, the disclosure of which is expressly incorporated by reference herein.

BACKGROUND OF THE INVENTION

1. Field of the Invention

The present invention relates to an apparatus and method for demonstrating the user interface of a machine tool controller.

2. Description of the Related Art

Figure 1:
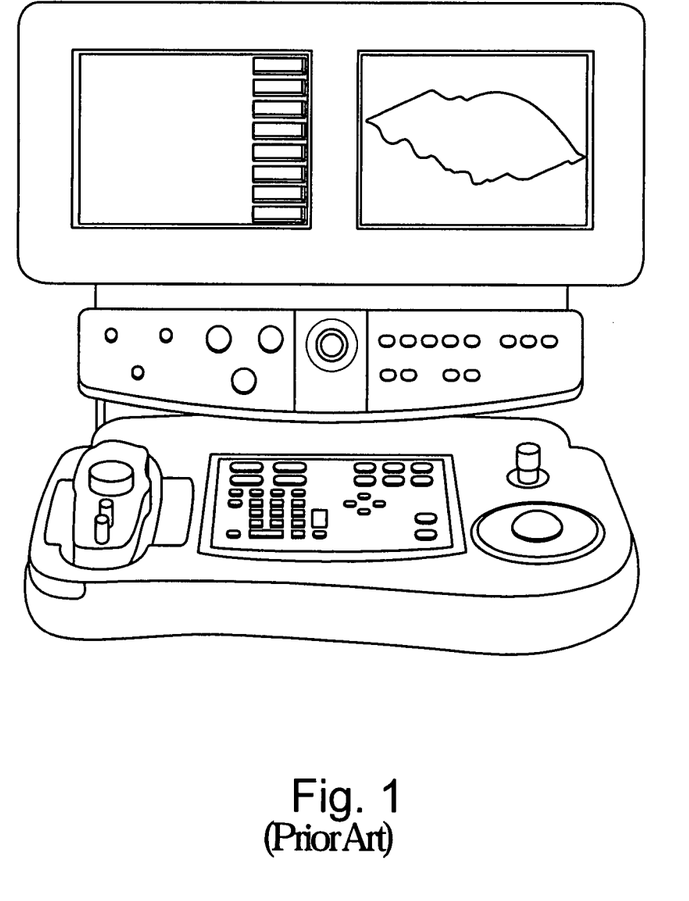
FIGS. 1 and 2 are perspective views of exemplary machine tool controllers that may be simulated by use of the present invention.
Figure 2:
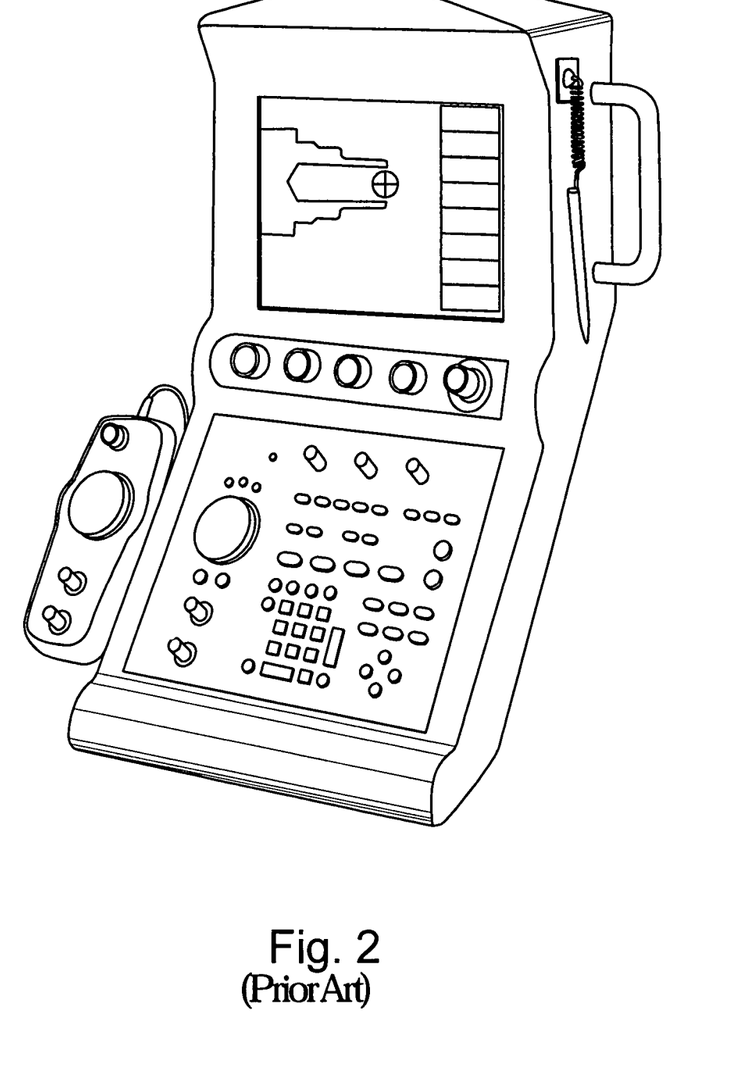

A machine tool controller provides an electronic interface that enables a user to control the motion of a machine tool. Occasionally there is a need to demonstrate the user interface of the machine tool controller, such as at a trade show or to a customer. The controller itself may be bulky and/or heavy, and thus not easily transportable for such demonstrations. Further, several different models, examples of which are shown in FIGS. 1 and 2, may need to be demonstrated, thereby increasing the transportation burden.

SUMMARY OF THE INVENTION

The present invention provides an easily transportable simulator that may be used in conjunction with a laptop or "notebook" computer in order to simulate the operation of various machine tool controllers. The present invention also provides a method of simulating a machine tool controller by use of the simulator and the laptop.

In an exemplary embodiment of the present disclosure, a machine tool control simulator for a machine tool control having a plurality of first user-actuatable devices and a first display screen is provided. The simulator includes a console and a laptop computer. The console includes a plurality of second user-actuatable devices each corresponding to a respective one of the first user-actuatable devices. The second user-actuatable devices have a layout substantially similar to a layout of the first user-actuatable devices. A communication medium is coupled to the second user-actuatable devices and communicates user inputs provided via the second user-actuatable devices. A support apparatus is connected to the second user-actuatable devices and supports the second user-actuatable devices above a tabletop. The laptop computer includes a keyboard and an attached second display screen. The keyboard is placed between the tabletop and the second user-actuatable devices. The computer is coupled to the communication medium to thereby receive the user inputs. The computer displays images on the second display screen in response to the user inputs. The images simulate images that would be displayed on the first display screen of the machine tool control in response to the user inputs.

In another exemplary embodiment of the present disclosure, a method of simulating a machine tool control is provided. The method includes the steps of providing a laptop computer having a keyboard and a display screen. A console is provided including user-actuatable devices that match user-actuatable devices of the machine tool control. The console is supported above the keyboard. User inputs are received via the user-actuatable devices. The user inputs are communicated from the console to the laptop computer. Images are displayed on the display screen dependent upon the user inputs. The images correspond to images that would be displayed by the machine tool control in response to inputs substantially similar to the user inputs.

In a further exemplary embodiment of the present disclosure, a machine tool control simulator for a machine tool control having a plurality of first user-actuatable devices and a first display screen is provided. The simulator comprising a console and a laptop computer. The console including a plurality of second user-actuatable devices each corresponding to a respective one of the first user-actuatable devices, the second user-actuatable devices having a layout substantially similar to a layout of the first user-actuatable devices; and a communication medium coupled to the second user-actuatable devices and configured to communicate at least a first user input provided via the second user-actuatable devices. The laptop computer including a keyboard and an attached second display screen, the computer being coupled to the communication medium to thereby receive the at least a first user input. The computer being configured to display images on the second display screen in response to the at least a first user input, the images simulating the first display screen of the machine tool control in response to the same at least a first user input.

In yet another exemplary embodiment of the present disclosure, a method of simulating a machine tool control is provided. The method comprising the steps of providing a laptop computer including a keyboard and a display screen; providing a console including user-actuatable devices that match user-actuatable devices of the machine tool control; coupling the console to the laptop computer; receiving user inputs via the user-actuatable devices; communicating the user inputs from the console to the laptop computer; and displaying images on the display screen dependent upon the user inputs. The images corresponding to images that would be displayed by the machine tool control in response to inputs substantially similar to the user inputs.

In yet a further exemplary embodiment of the present disclosure, a machine tool control simulator for a machine tool control having a plurality of first user-actuatable devices and a first display screen is provided. The simulator comprising a computer having software configured to simulate the machine tool control, the computer including a keyboard and a display; a touch screen positioned over the display of the computer; and a console including a plurality of second user-actuatable devices each corresponding to a respective one of the first user-actuatable devices. The second user-actuatable devices having a layout substantially similar to a layout of the first user-actuatable devices. The console being coupled to the computer independent of the keyboard of the computer.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE DRAWINGS

In general, the invention is directed to a device that may be laid over a laptop computer in order to enable the combination of the device and the laptop to simulate a machine tool controller or to a device that is positionable proximate a laptop computer to simulate a machine tool controller. FIGS. 1 and 2 show two versions of a production machine tool controller that may be simulated by the present invention, the ULTIMAX brand controller available from Hurco Companies, Inc. located at One Technology Way, Indianapolis Ind. 46268. ULTIMAX brand controllers ergonomic design has easy-to-understand buttons. The slim, touch-screen, color monitor makes every programming task almost effortless. ULTIMAX brand controllers primary distinction is the dual-panel display (see FIG. 1). With the interactive graphics, simply touch the portion of the part to edit (displayed on the right screen) and on the left screen the ULTIMAX brand controller takes you right to the corresponding portion of code—whether conversational or NC programming is being used. Each of the two versions are rather bulky and may be difficult to transport for purposes of being demonstrated, such as by a salesman for example.

Figure 3:
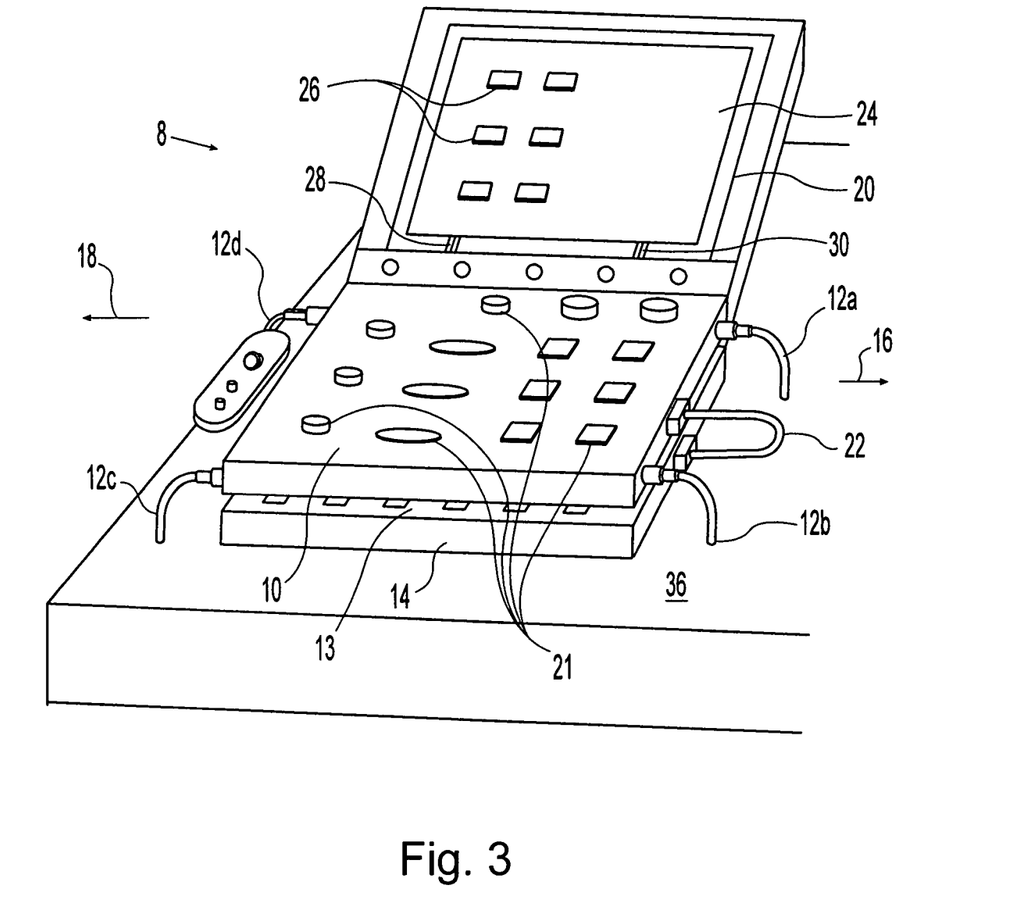
FIG. 3 is a perspective view of one embodiment of a laptop-based machine control simulator of the present invention.

As shown in FIG. 3, a laptop-based machine tool control simulator 8 of the present invention includes a console 10 that may have a look and feel that closely matches one or more of the machine tool controls that are to be simulated. Console 10 may include a support apparatus in the form of four telescoping legs 12a-d that suspend console 10 above a keyboard 13 of a laptop computer 14. Laptop 14 and the distal ends of legs 12a-d may be supported by a surface such as a tabletop. Legs 12a-d may be variably extended in lateral directions 16, 18 to accommodate laptop keyboards of various widths. In one embodiment, simulator 8 does not include legs 12a-d. Rather, simulator 8 is positionable on the tabletop proximate the laptop computer 14, such as in front or to one side.

Laptop 14 may be loaded with a software program via a compact disc (CD) (not shown) that enables a display screen 20 of laptop 14 to simulate the display screen of at least one of the two controllers shown in FIGS. 1 and 2. Different compact discs may be loaded into laptop 14 in order to enable simulation of different models of machine tool controllers. Alternatively, a single compact disc may include programs that enable the simulation of a number of models of the machine tool controllers. In one embodiment, the simulation programs loaded into laptop 14 are based on the WINDOWS brand software products produced by Microsoft Corporation of Redmond, Wash.

Console 10 may be in communication with laptop 14 via a communication medium in the form of a USB cable 22 such that the images displayed on screen 20 may react to, and depend upon, user inputs received via console 10. In order to receive the user inputs, console 10 may include user-actuatable devices that match user-actuatable devices of the machine tool control that is being simulated. More particularly, the user may provide inputs by actuating devices 21 on console 10, which devices may include various dials, pushbuttons, knobs, switches, etc. on console 10. These user inputs may be communicated to laptop 14 via cable 22. The program loaded into laptop 14 may then process the user inputs and change the images displayed on screen 20 accordingly to thereby mimic how a display screen of an actual machine tool control would react to the same user inputs. That is, the images displayed on screen 20 may correspond to images that would be displayed by the actual machine tool control in response to user inputs that are substantially similar to the user inputs received via console 10.

The actual machine tool controls may have touch-sensitive screens that enable a user to touch the screen in designated areas to thereby provide user inputs. Of course, a standard laptop computer does not include a touch-sensitive screen. Thus, in order to better simulate an actual machine tool control, the present invention may include a transparent touch screen 24 that provides an alternative medium, in addition to devices 21, for simulator 8 to receive user inputs. Touch screen 24 may be applied to or overlaid on screen 20 of laptop 14.

Touch screen 24 may include parallel top and bottom thin sheets or layers (not shown) with known electrically resistive properties. When a user's finger or a tool presses on and indents the top layer, the top layer and the bottom layer physically contact each other and are electrically shorted together. A known voltage can be applied to one of the layers, and the other layer can be connected to ground through a resistor. By measuring the voltage drop from a point on one layer to a point on the other layer, the total resistance between the two points can be determined, and thus the coordinates of the point on the top layer at which the indentation occurred can be calculated from the known patterns of resistance on the top and bottom layers. The bottom layer may be laminated to a transparent panel that is highly resistant to breakage.

Displayed on screen 20 may be indicia, such as "buttons" or icons 26, that a user may select by pressing a section of touch screen 24 that overlays the selected button 26. Touch screen 24 may detect the location on touch screen 24 that was pressed by the user, and may send a signal indicative thereof to console 10 and/or laptop 14. Thus, touch screen 24 enables the touch screen features of the actual machine tool controller to be simulated. Console 10 may be in communication with touchscreen 24 via conduits 28, 30 which may be in the form of wires.

When a user touches touch screen 24 with a finger or some type of tool, touch screen 24 can transmit a signal to console 10 and/or laptop 14 to indicate the value of a voltage drop associated with touch screen 24. From the value of the voltage drop, an electronic processor within console 10 or laptop 14 can determine the location on touch screen 24 that has been touched, as discussed above.

Figure 4:
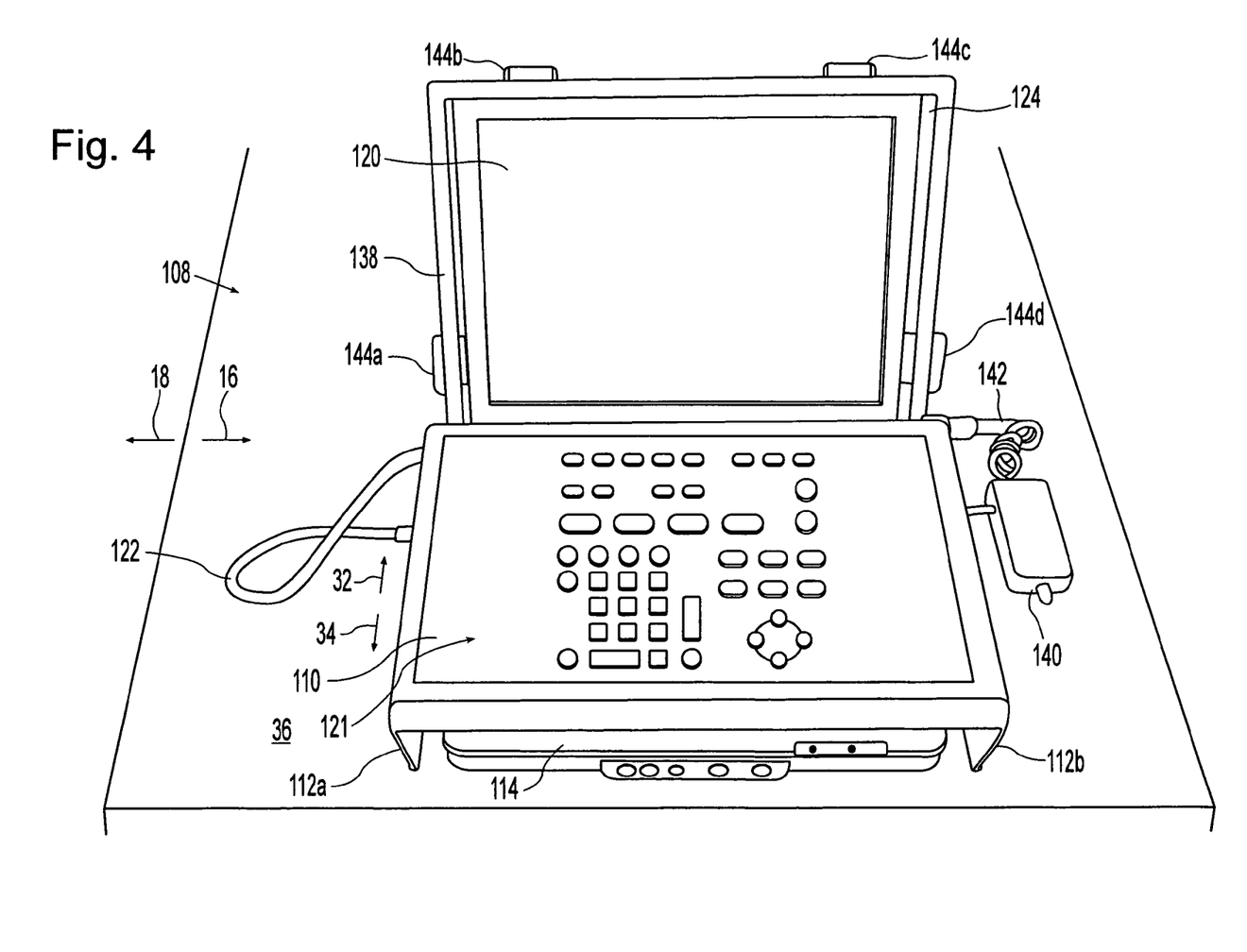
FIG. 4 is a perspective view of another embodiment of a laptop-based machine control simulator of the present invention.
Figure 5:
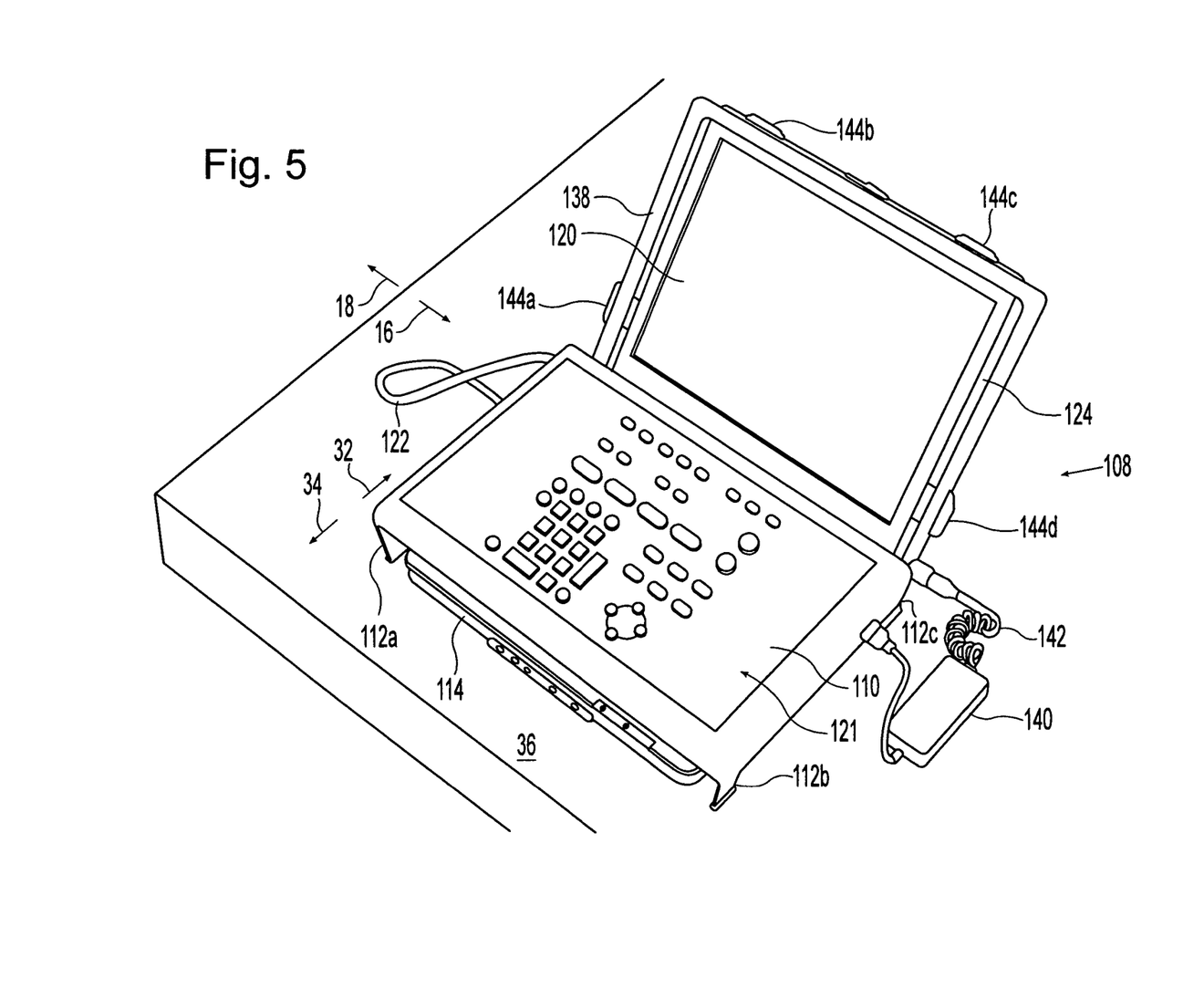
FIG. 5 is another perspective view of the laptop-based machine control simulator of FIG. 4.
Figure 10:
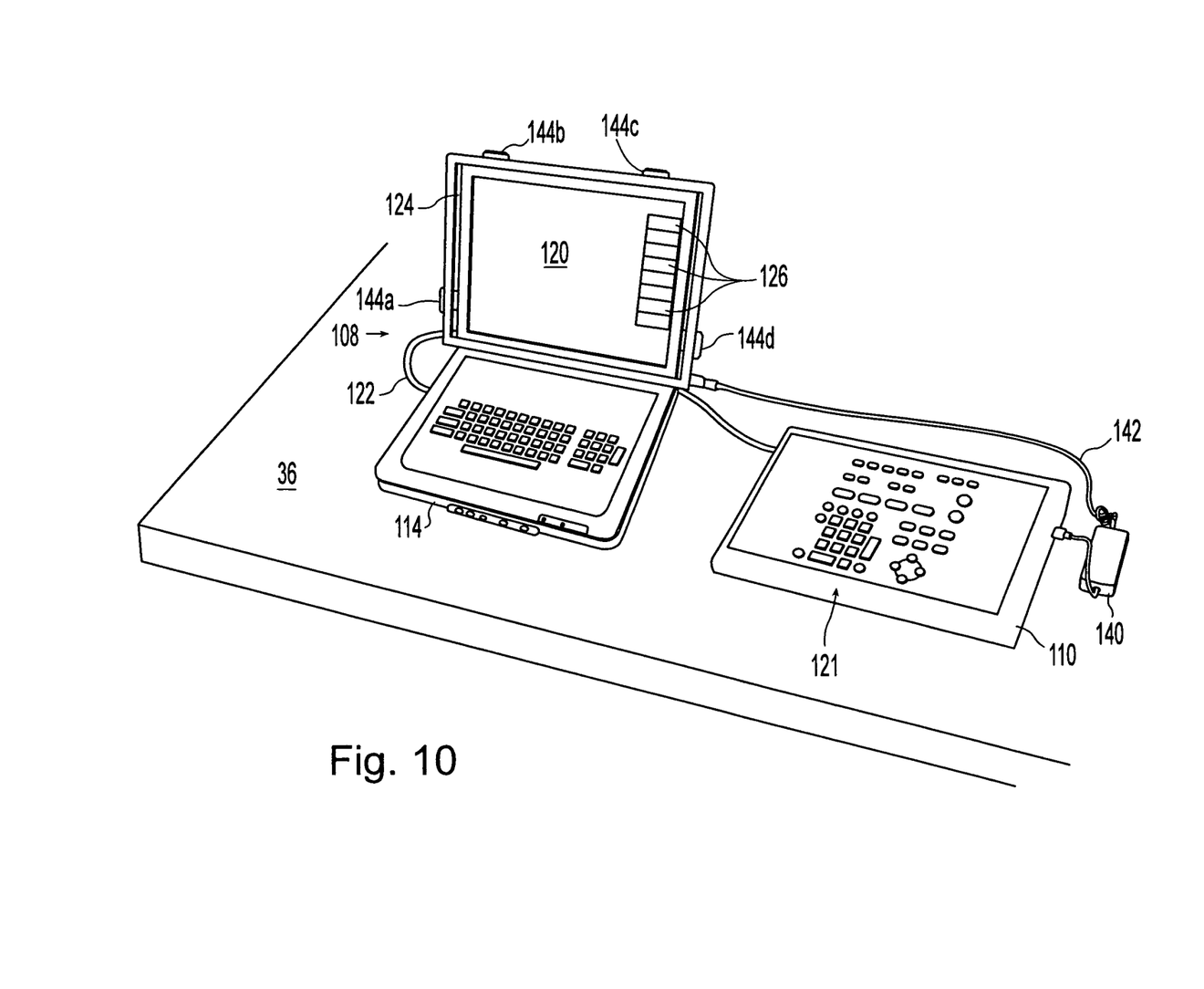
FIG. 10 is a perspective view of yet another embodiment of a laptop-based machine control simulator of the present invention.

Illustrated in FIG. 4 is another embodiment of a laptop-based machine tool control simulator 108 of the present invention. Simulator 108 includes a console 110 that may have a look and feel that closely matches one or more of the machine tool controls that are to be simulated. Console 110 may include a support apparatus in the form of four upstanding legs, only three of which (legs 112a-c) are visible in the drawings (FIG. 5). In one embodiment, each of the four legs is disposed at a respective corner of console 110. In one embodiment, each of the four legs has a relatively small width along lateral directions 16, 18 in order to both leave space for a laptop computer 114 to fit beneath console 110, and to limit the width of simulator 108 along lateral directions 16, 18. In one embodiment, each of the four legs has a relatively large length along fore and aft directions 32, 34 in order to provide console 110 with an adequate level of stability. Laptop 114 and the distal ends of the four legs 112 may be supported by a surface such as tabletop 36. In one embodiment, console 110 does not include a support apparatus (see FIG. 10). In this embodiment, console 110 is positioned on tabletop 36 adjacent laptop 114, such as in front of laptop 114 or to a side of laptop 114, as shown in FIG. 10.

In one embodiment, laptop 114 has loaded thereon a software program via a compact disc (CD) (not shown) that enables a display screen 120 of laptop 114 to simulate the display screen of at least one of the two controllers shown in FIGS. 1 and 2. Different compact discs may be loaded into laptop 114 in order to enable simulation of different models of machine tool controllers. Alternatively, a single compact disc may include programs that enable the simulation of a number of models of the machine tool controllers. In one embodiment, the simulation programs loaded into laptop 114 are based on the WINDOWS software products produced by Microsoft Corporation.

Figure 7:
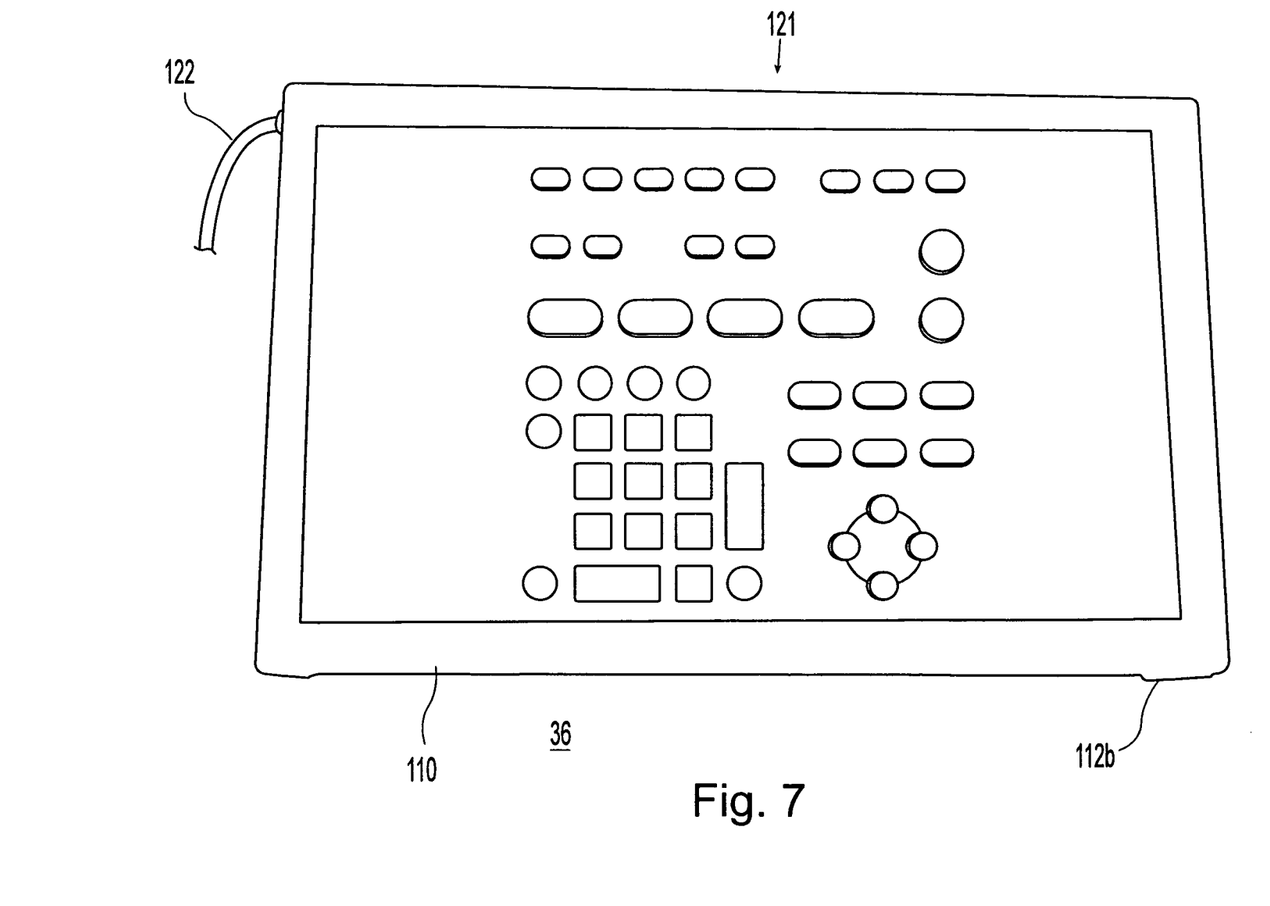
FIG. 7 is an overhead view of the console of FIG. 4.

Console 110 may be in communication with laptop 114 via a communication medium in the form of a USB cable 122 such that the images displayed on screen 120 may react to, and depend upon, user inputs received via console 110. In order to receive the user inputs, console 110 may include user-actuatable devices that match user-actuatable devices of the machine tool control that is being simulated. More particularly, the user may provide inputs by actuating devices 121 on console 110, which, in the embodiment shown, includes various pushbuttons on console 110. Console 110 and pushbuttons 121 are best shown in FIG. 7. Pushbuttons 121 have a physical layout or arrangement that is similar or identical to the layout or arrangement of the actual machine tool controls illustrated in FIG. 2.

The user inputs received via devices 121 may be communicated to laptop 114 via cable 122. The program loaded into laptop 114 may then process the user inputs and change the images displayed on screen 120 accordingly to thereby mimic how a display screen of an actual machine tool control would react to the same user inputs. That is, the images displayed on screen 120 may correspond to images that would be displayed by the actual machine tool control in response to user inputs that are substantially similar to the user inputs received via console 110.

The actual machine tool controls may have touch-sensitive screens that enable a user to touch the screen in designated areas to thereby provide user inputs. Of course, a standard laptop computer does not include a touch-sensitive screen. Thus, in order to better simulate an actual machine tool control, the present invention may include a predominantly transparent touch screen 124 that provides an alternative medium, in addition to devices 121, for simulator 108 to receive user inputs. Touch screen 124 may be applied to or overlaid on screen 120 of laptop 114. In this embodiment, touch screen 124 is larger, in terms of width and height, than is display screen 120 of laptop 114. This is in contrast to the embodiment of FIG. 3 in which display screen 20 is larger than touch screen 24.

Touch screen 124 may include parallel top and bottom thin sheets or layers (not shown) with known electrically resistive properties. The sheets may be retained within an outer frame 138 of touch screen 124. When a user's finger or a tool presses on and indents the top layer, the top layer and the bottom layer physically contact each other and are electrically shorted together. A known voltage can be applied to one of the layers, and the other layer can be connected to ground through a resistor. By measuring the voltage drop from a point on one layer to a point on the other layer, the total resistance between the two points can be determined, and thus the coordinates of the point on the top layer at which the indentation occurred can be calculated from the known patterns of resistance on the top and bottom layers. The bottom layer may be laminated to a transparent panel that is highly resistant to breakage.

Figure 6:
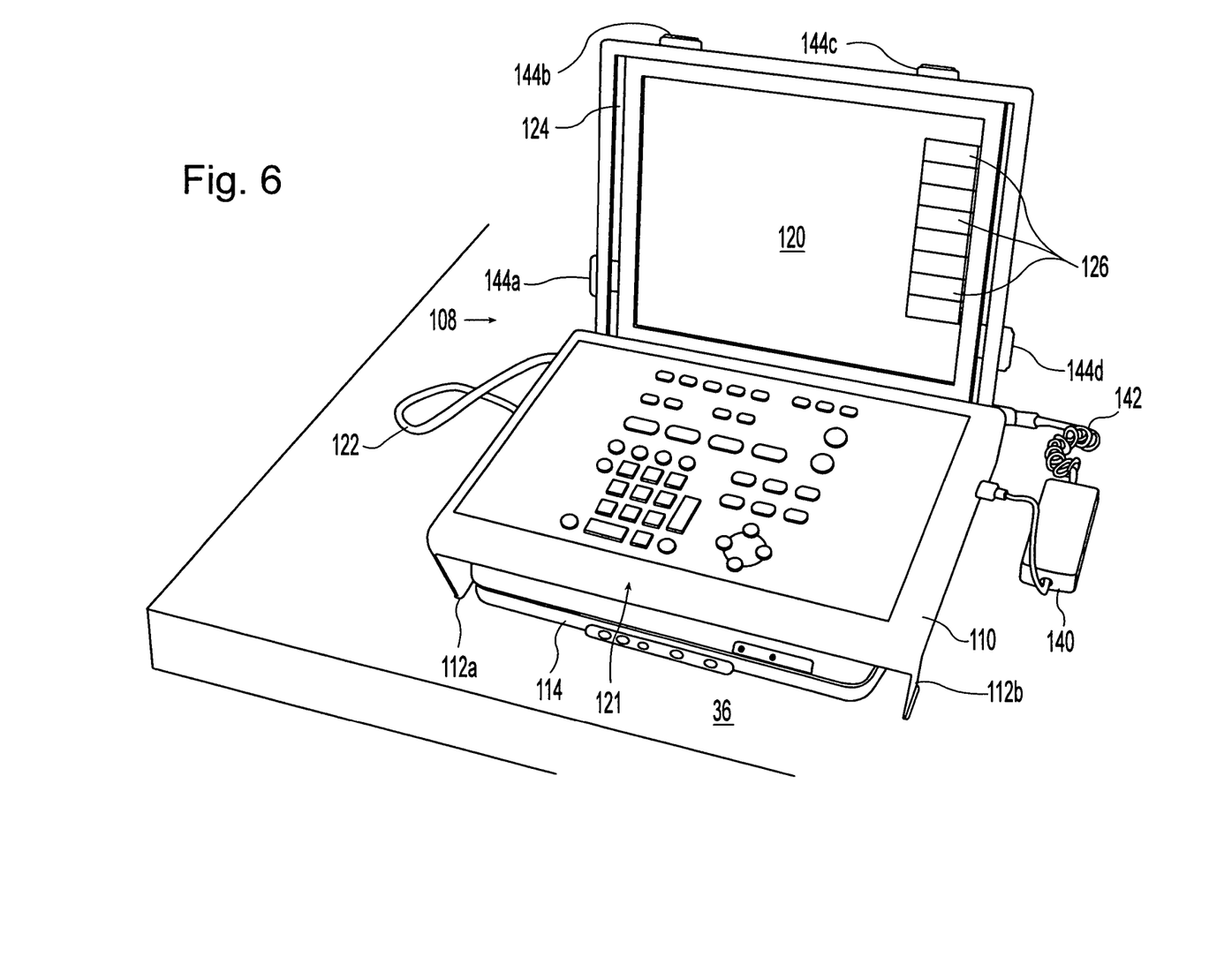
FIG. 6 is yet another perspective view of the laptop-based machine control simulator of FIG. 4.

Displayed on screen 120 may be indicia, such as "buttons" or icons 126, best shown in FIG. 6, that a user may select by pressing a section of touch screen 124 that overlays the selected button 126. Touch screen 124 may detect the location on touch screen 124 that was pressed by the user, and may send a signal indicative thereof to laptop 114. Thus, touch screen 124 enables the touch screen features of the actual machine tool controller to be simulated. Touch screen 124 may be in communication with laptop 114 via a USB-X controller 140 that is electrically connected to a USB port interface on laptop 114. A connection cable 142 electrically connects touch screen 124 to controller 140.

When a user touches touch screen 124 with a finger or some type of tool, touch screen 124 transmits a signal to laptop 114 to indicate the value of a voltage drop associated with touch screen 124. From the value of the voltage drop, an electronic processor within laptop 14 determines the location on touch screen 124 that has been touched, as discussed above.

Figure 8:
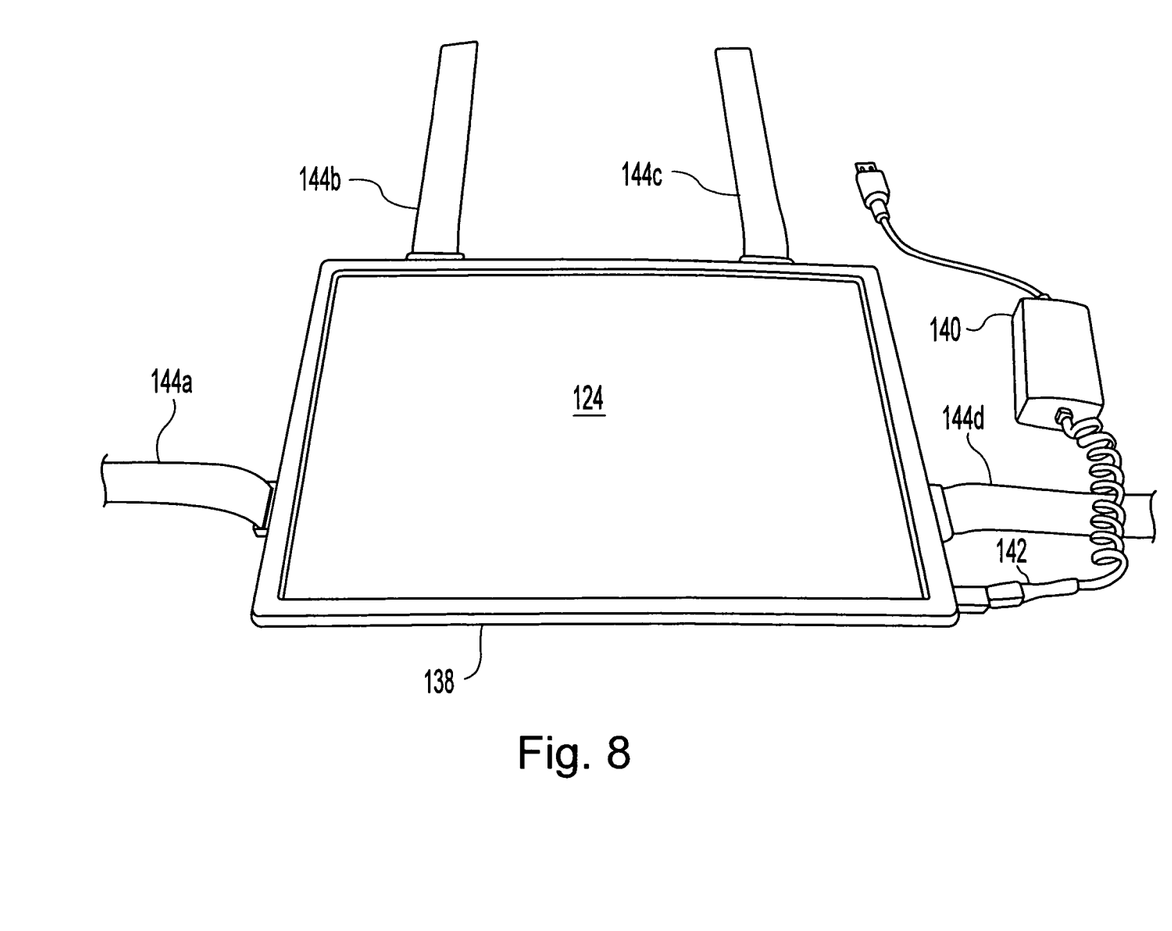
FIG. 8 is a perspective view of the touch screen of the laptop-based machine control simulator of FIG. 4.
Figure 9:
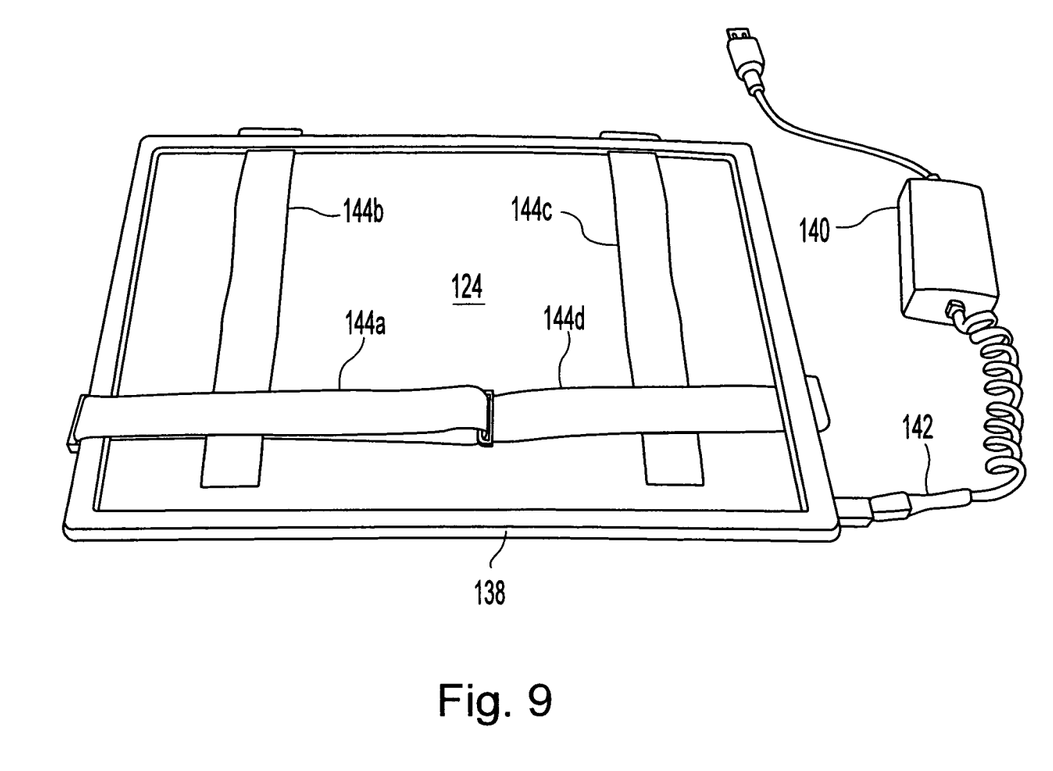
FIG. 9 is another perspective view of the touch screen of the laptop-based machine control simulator of FIG. 4.

As best shown in FIGS. 8 and 9, touch screen 124 in one embodiment includes straps 144a-d having hook and loop type fasteners for attaching touch screen 124 to display screen 120 of laptop 114.

In the embodiment shown, touch screen 124 is in the form of a model KTMT-1500 Add-On MAGIC TOUCH® Touch Screen for a fifteen inch notebook computer, produced by Keytec, Inc. of Richardson, Tex.

While this invention has been described as having an exemplary design, the present invention may be further modified within the spirit and scope of this disclosure. This application is therefore intended to cover any variations, uses, or adaptations of the invention using its general principles.

What is claimed is:

1. A machine tool control simulator for a machine tool control having a plurality of first user-actuatable devices and a first display screen, the simulator comprising:
a console simulating a user interface configured for programming of the machine tool control, which controls a motion of a machine tool, the user interface corresponding to a conversation programming interface or a numerical control ("NC") programming interface, the console including:
a top face;
a plurality of second user-actuatable devices for inputting data to the user interface, each corresponding to a respective one of the first user-actuatable devices, the second user-actuatable devices extending above the top face and having a layout substantially similar to a layout of the first user-actuatable devices; and
a communication medium coupled to the second user-actuatable devices and configured to communicate at least a first user input provided via the second user-actuatable devices;

a laptop computer including a keyboard and an attached second display screen, wherein the laptop computer is coupled to the communication medium;

a transparent touch screen coupled to the laptop computer for receiving a second user input, said transparent touch screen is overlaid on said second display screen, said transparent touch screen includes parallel to and bottom thin layers with known electrical resistive properties, wherein point of contact or input location on the transparent touch screen is determined by measuring a value of a voltage drop from a point in one layer to a point on the other layer after applying a known voltage to one of the layers while grounding the other layer via a resistor, and wherein the transparent touch screen sends a signal to the console or the laptop to indicate the value of the voltage drop, and the console or the laptop determines the input location from the voltage drop; and the laptop computer being coupled to the communication medium to thereby receive the at least first user input, the laptop computer being configured to display images on the second display screen in response to the at least first user input, the images simulating the first display screen of the user interface of the machine tool control in response to the at least first user input.

2. The machine tool control simulator of claim 1, wherein the second user-actuatable devices include at least one of a dial, a button, a knob, and a switch.

3. The machine tool control simulator of claim 1, wherein the communication medium comprises a cable.

4. The machine tool control simulator of claim 1, wherein the console further comprises a support apparatus to support the plurality of second user-actuatable devices spaced apart from the keyboard of the laptop, the support apparatus comprising a plurality of legs.

5. The machine tool control simulator of claim 4, wherein the support apparatus is configured to be telescoped in lateral directions to accommodate various widths of the keyboard between at least a first leg and a second leg.

6. The machine tool control simulator of claim 1, wherein the laptop computer includes a processor coupled to the communication medium to thereby receive the at least a first user input, the processor being configured to control the images displayed on the second display screen.

7. The machine tool control simulator of claim 1, wherein the laptop computer includes a port coupled to the communication medium to thereby receive the at least a first user input.

8. The machine tool control simulator of claim 1, wherein the computer is configured to display images of a part being edited.

9. A method of simulating a machine tool control, comprising the steps of:

providing a laptop computer including a keyboard and a display screen;

providing a console simulating a user interface configured for programming of the machine tool control which controls a motion of a machine tool, the user interface corresponding to a conversation programming interface or a numerical control ("NC") programming interface, the console including user-actuatable devices that match user-actuatable devices of the machine tool control;

providing a transparent touch screen;

coupling the console to the laptop computer;

coupling the transparent touch screen to the laptop computer, wherein the transparent touch screen is overlaid on the display screen, said transparent touch screen includes parallel to and bottom thin layers with known electrical resistive properties, wherein point of contact or input location on the transparent touch screen is determined by measuring a value of a voltage drop from a point in one layer to a point on the other layer after applying a known voltage to one of the layers while grounding the other layer via a resistor, and wherein the transparent touch screen sends a signal to the console or the laptop to indicate the value of the voltage drop, and the console or the laptop determines the input location from the voltage drop;

positioning the console over the keyboard;

receiving user inputs for the user interface via the user-actuatable devices without interaction between the user-actuatable devices and the keyboard;

communicating the user inputs from the console to the laptop computer; and displaying images on the display screen dependent upon the user inputs, the images corresponding to images that would be displayed by the user interface of the machine tool control in response to inputs substantially similar to the user inputs.

10. The method of claim 9, further comprising the steps of:

displaying on the display screen of the laptop computer indicia corresponding to inputs; and communicating user inputs from the touch screen to the laptop computer.

11. The method of claim 10, comprising the further step of communicating user inputs directly from the touch screen to the laptop computer.

12. The method of claim 9, wherein the step of communicating the user inputs from the console to the laptop computer is performed independent of a keyboard of the laptop computer.

13. The method of claim 9, wherein displaying images includes images of a part being edited.

14. A machine tool control simulator for a machine tool control having a plurality of first user-actuatable devices and a first display screen, the simulator comprising:

a computer having software configured to simulate the machine tool control, the computer including a keyboard and a display;

a console simulating a user interface of the machine tool control which controls a motion of a machine tool, the user interface corresponding to a conversation programming interface or a numerical control ("NC") programming interface, the console including a plurality of second user-actuatable devices for inputting data to the user interface, each corresponding to a respective one of the first user-actuatable devices, the second user-actuatable devices having a layout substantially similar to a layout of the first user-actuatable devices, wherein the console is coupled to the computer independent of the keyboard of the computer, and wherein operation of the second user-actuatable devices inputs programming data to the user interface, and the user interface displays results on the display substantially similar to the results displayed on a machine tool control with similar inputs to the first user-actuatable devices;

a transparent touch screen coupled to the computer for receiving user input, said transparent touch screen is overlaid on the display of the computer, said transparent touch screen includes parallel to and bottom thin layers with known electrical resistive properties, wherein point of contact or input location on the transparent touch screen is determined by measuring a value of a voltage drop from a point in one layer to a point on the other layer after applying a known voltage to one of the layers while grounding the other layer via a resistor, and wherein the transparent touch screen sends a signal to the console or the computer to indicate the value of the voltage drop, and the console or the computer determines the input location from the voltage drop; and a support apparatus configured to support the console over the keyboard of the computer.

15. The machine tool control simulator of claim 14, wherein the support apparatus includes a plurality of legs.

16. The machine tool control simulator of claim 14, wherein the software displays on the display of the computer at least a first indicia corresponding to an input region.

17. The machine tool control simulator of claim 14, wherein the second user-actuatable devices include at least one of a dial, a button, a knob, and a switch.

18. The machine tool control simulator of claim 14, wherein the console is coupled to the computer through a cable.

\* \* \* \* \*